US007170449B2

(12) United States Patent
Eide

(10) Patent No.: US 7,170,449 B2
(45) Date of Patent: Jan. 30, 2007

(54) ANTENNA SYSTEM FOR GEORADAR

(75) Inventor: Egil Eide, Tiller (NO)

(73) Assignee: 3D-Radar AS, Tiller (NO)

( * ) Notice: Subject to any disclaimer, the term of this patent is extended or adjusted under 35 U.S.C. 154(b) by 95 days.

(21) Appl. No.: 10/531,728

(22) PCT Filed: Oct. 6, 2003

(86) PCT No.: PCT/NO03/00332

§ 371 (c)(1),
(2), (4) Date: Apr. 18, 2005

(87) PCT Pub. No.: WO2004/042427

PCT Pub. Date: May 21, 2004

(65) Prior Publication Data

US 2006/0012525 A1 Jan. 19, 2006

(30) Foreign Application Priority Data

Nov. 5, 2002 (NO) .................................. 20025295

(51) Int. Cl.
H01Q 1/38 (2006.01)
(52) U.S. Cl. .............................. 343/700 MS; 343/893; 343/846; 343/853; 343/727; 343/730; 343/767
(58) Field of Classification Search ......... 343/700 MS, 343/727, 730, 893, 846, 767, 770
See application file for complete search history.

(56) References Cited

U.S. PATENT DOCUMENTS 4,746,867 A * 5/1988 Gunton ....................... 324/329
4,978,965 A * 12/1990 Mohuchy .................... 343/727
5,166,697 A * 11/1992 Viladevall et al. .......... 343/727
6,218,989 B1 * 4/2001 Schneider et al. ... 343/700 MS
6,552,691 B2 * 4/2003 Mohuchy et al. ........... 343/770

FOREIGN PATENT DOCUMENTS

JP 63304188 A 12/1988
JP 1009387 A 1/1989

OTHER PUBLICATIONS

Brown, G.H., et al., "Experimentally Determined Radiation Characteristics of Conical and Triangular Antennas*," RCA Review, Dec. 1952, pp. 425-453.
Eide, E.S., "Radar Imaging of Small Objects Closely Below the Earth Surface," Department of Telecommunications, Norwegian University of Science and Technology, Aug. 2000, pp. 1 00-101 and 108-111.
Eide, E.S., "Ultra-wideband transmit/receive antenna pair for ground penetrating radar," IEE Proceedings-Microwaves, Antennas and Propagation, Jun. 2000, No. 147(3), pp. 231-235.

* cited by examiner

Primary Examiner—Tho Phan
Assistant Examiner—Chuc Tran
(74) Attorney, Agent, or Firm—Rothwell, Figg, Ernst & Manbeck

(57) ABSTRACT

An antenna system for ground penetrating radar, comprising at least two orthogonally mounted transmitter antenna elements (1, 2) and at least two orthogonally mounted receiver antenna elements (3, 4), in which the antenna elements consist of triangular monopoles formed by adding metal surfaces to a plate carrier (6), made of fiberglass substrate, that is mounted on the bottom side of a layer of radar absorbing material (7), wherein the upper side of the absorber is covered by a metallic ground plane (8).

10 Claims, 2 Drawing Sheets

ANTENNA SYSTEM FOR GEORADAR

CROSS REFERENCE TO RELATED APPLICATIONS

This application is a 35 U.S.C. § 371 National Phase Entry Application from PCT/NO03/000332, filed Oct. 6, 2003.

BACKGROUND OF INVENTION

1. Field of the Invention

This invention relates to an antenna system for a ground penetrating radar (georadar), where the transmitted electromagnetic field can be controlled to give two different orthogonal polarisations. The antenna system is mounted closely to the ground surface, such that the transmitted electromagnetic waves are primarily radiated downwards into the ground.

2. Description of the Related Art

A ground penetrating radar (georadar) is a type of radar that transmits electromagnetic waves (radio waves) downwards into the ground and measures reflections from objects or interface layers in the subsurface. The antenna for such a radar must ensure that the transmitted radar signal penetrates the ground as much as possible. To obtain this, the antenna should be located as close to the ground as possible. To obtain sufficient isolation between the georadar's transmitter and receiver, it is common to use separate transmitter and receiver antennae that are mounted beside each other.

The so-called "bowtie"-antennas have commonly been used in applications where one needs high bandwidth. The most widely known paper on such antennae was published by G. H. Brown and O. M. Woodward in RCA Review, pp 425–452, in December 1952, and since then there have been published many papers on different versions of this type of antenna. For georadar it has been common practice to apply "bowtie"-to-unbalanced) transformers for a satisfactory operation. In 2000 E. S. Eide published a paper in IEE Transactions on Microwave, Antennas and Propagation, Vol. 147, No. 3, that described a new antenna system consisting of a pair of "bowtie"-monopoles that are mounted on a V-shaped ground plane. Since this antenna system consisted of monopoles instead of dipoles, it was not necessary to use baluns with the antenna. However, the shape of the ground plane implies that one has to use relatively large amounts of loss material(s) (absorbers) to fill the space between the ground plane and the antenna elements. The biggest disadvantage with this antenna system was, however, that the shape of the ground plane made it difficult to connect the outer edges for the antennae to ground via resistors. Now the antenna has been further developed into a new antenna system according to the present invention, that results in a new and improved solution to the aforementioned problems so-called.

The object of the present invention is to produce a more compact antenna system by redesigning the ground plane and other design elements. Another object of the invention is to make possible a more efficient connection to the ground plane. The special features of the invented antenna system appear in the independent claim 1. Further features are given in the dependent claims.

BRIEF DESCRIPTION OF THE DRAWINGS

The invention will be explained in the following section, in which references are made to the accompanying drawings, where.

DETAILED DESCRIPTION OF THE INVENTION

Figure 1:
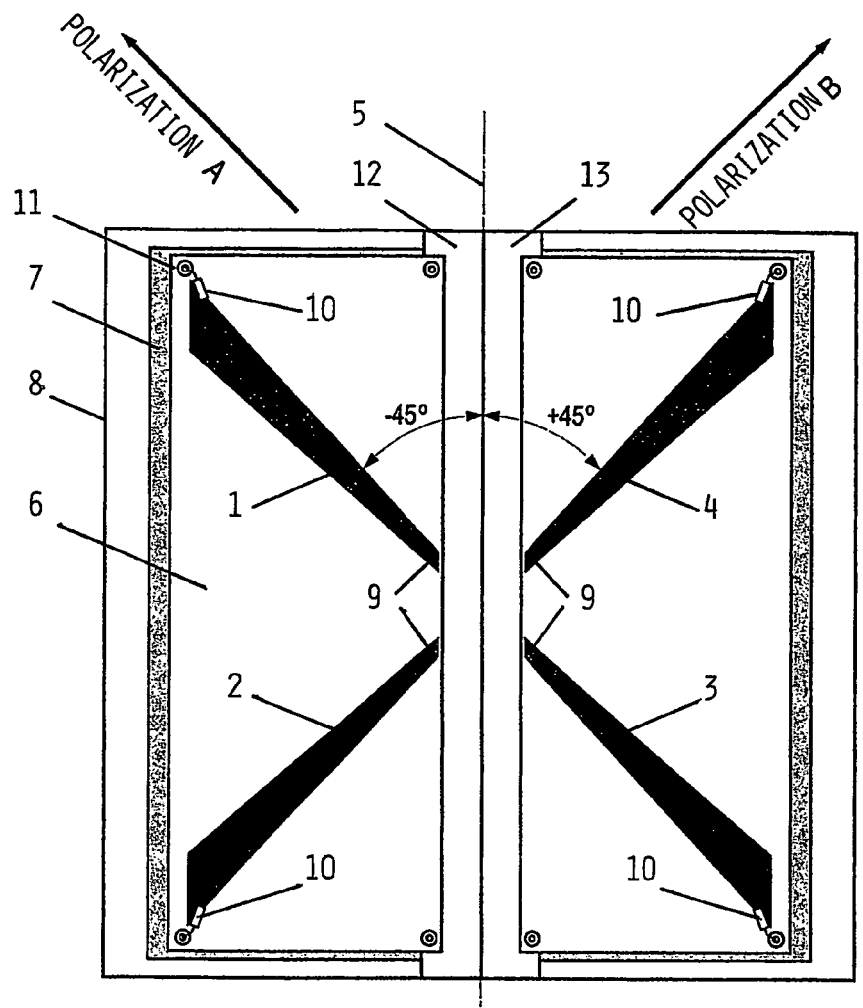
FIG. 1 shows a configuration of the antenna system according to the invention seen from the bottom side.

In FIG. 1 an antenna system is shown that consists of four antenna elements 1–4 that are mounted with a 45 degree angle with regard to the symmetry axis 5 of the antenna system, where two of the antenna elements 1, 2 enable transmitting with two orthogonal polarisations A and B, respectively. With the first polarisation A, the transmitted electric field is orientated 45 degrees to the symmetry axis 5 of the antenna system, while the field having the other polarisation B is orientated 135 degrees to the symmetry axis 5 of the antenna system. The remaining two antenna elements 3, 4 enable reception with the same orthogonal polarisations A and B, respectively. Choice of the first polarisation A takes place by connecting the radar transmitter to the first transmitter element 1 and the receiver to the first receiver element 3, while the other polarisation B is achieved by using the other two antenna elements 2, 4 for transmission and reception, respectively. The antenna elements 1–4 consist of triangle-shaped monopoles made of an electrically conducting material mounted on an electrically insulating plate carrier 6, e.g. a printed circuit board laminate with a thickness of 1.55 mm and of type FR-4. The printed circuit board laminates 6 are mounted on the bottom side of a plate-shaped layer of radar absorbing material 7, for example of type Eccosorb AN79 from Emerson & Cuming. The absorber layers are mounted on a back side ground plane 8 consisting of metal. The antenna elements 1–4 for transmission and reception are equal in structure. Each of the antenna elements are fed by a coaxial cable in feed points 9 where the centre conductor of the coaxial cable is connected to the antenna system and the screen is connected to the ground plane 8. The outer edges of the antenna elements 1–4 are connected to ground through resistors 10, with a value of for example 50 ohms, that are connected to metallic spacers 11 mounted on the ground plane 8.

Figure 2:
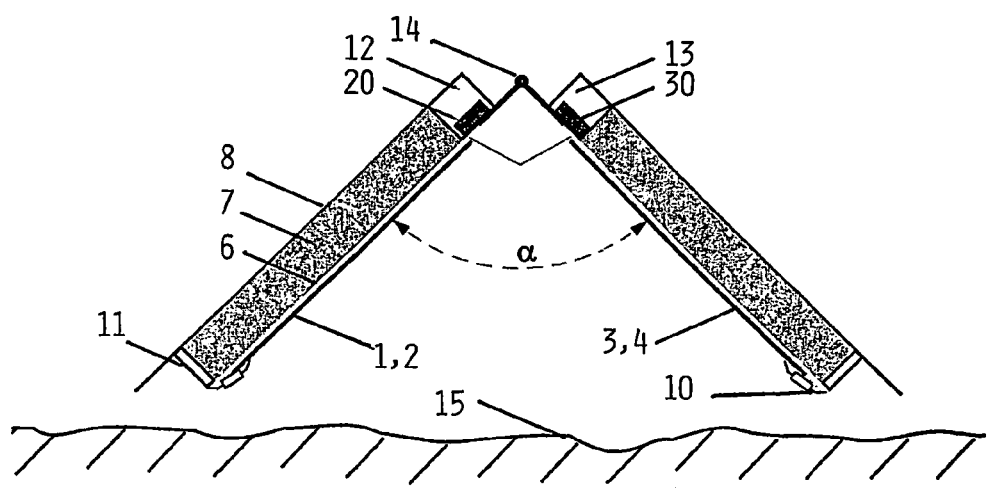
FIG. 2 shows a cross-section of the antenna system of FIG. 1 seen from the side.

FIG. 2 shows that the necessary electronics 20 for connection to the transmitter antenna elements 1, 2 is embedded in a metal box 12, while the required electronics 30 for connection to the receiver antenna elements 3, 4 is mounted in another metal box 13. The metal boxes 12, 13 also serve as a mechanical fixture for the printed circuit board laminate 6 and the ground plane 8, respectively. Thus, the boxes 12, 13 comprise edge structures of the antenna devices.

The outer edges of the antennae are always located closest to the ground 15, and the spacers 11 provide a mechanical support for the printed circuit board laminate 6 to the ground plane 8. The two parts of the ground plane in this example are connected to each other with a hinge 14 that gives the possibility to adjust the angle α between the antennas to an optimal value. The optimal value of this angle varies from measurement problem to measurement problem, determined by the dielectric properties of the soil. During operation, the antenna devices are oriented to have a downwards sloping position from the mentioned edge structures.

Figure 3:
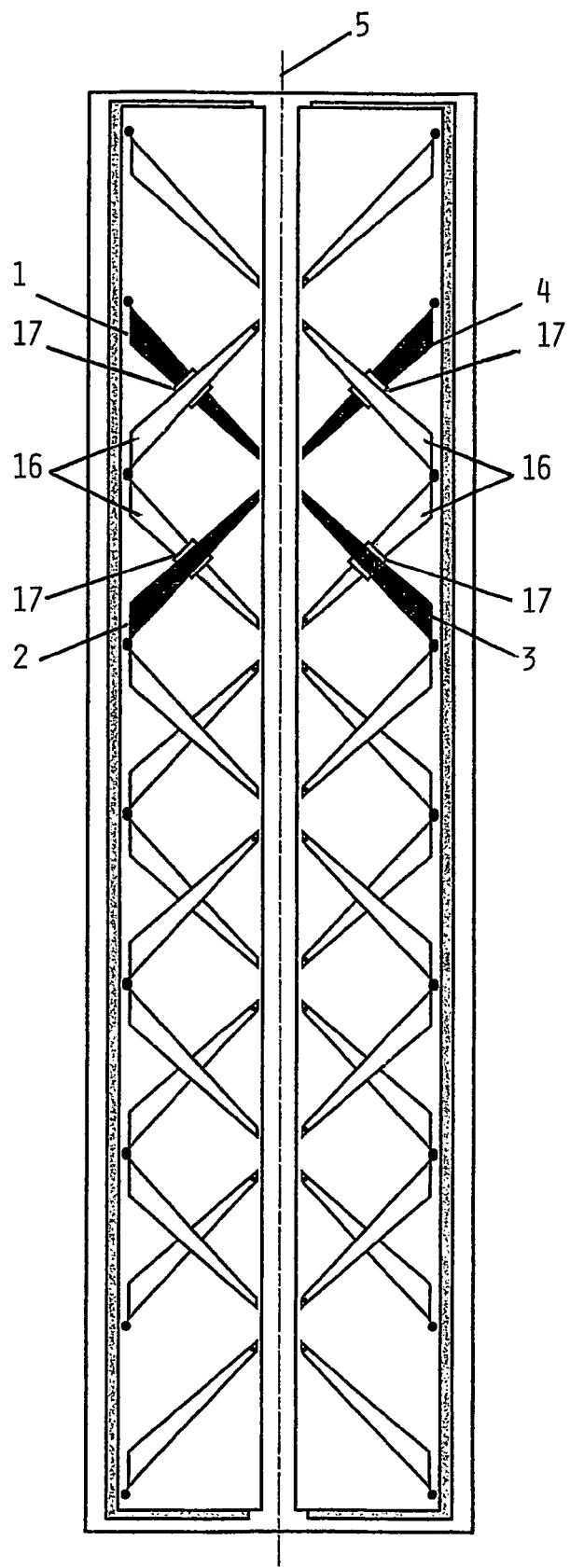
FIG. 3 shows another configuration of the antenna system according to the invention comprising an array of antenna subgroups, each consisting of four antenna elements.

Another configuration of the antenna system according to the invention is shown in FIG. 3. In this figure it is shown a linear antenna system consisting of several transmitter antenna elements and several receiver antenna elements forming an array of antenna subgroups that are distributed along the symmetry axis 5 of the antenna system, wherein each antenna subgroup consists of four antenna elements 1–4 that are emphasized, namely two transmitter antenna elements 1, 2 and two receiver antenna elements 3, 4. At least some of the antenna subgroups overlap each other, as overlapping neighbour antenna elements 2, 16 are separated in each intersection with an electrically insulating material 17 to prevent the current from flowing from the upper antenna element 2 down into the lower antenna element 16. The degree of overlapping of at least some of the antenna subgroups can be varied.

What is claimed is:

1. Antenna system for a ground penetrating radar, comprising:
    two plate-shaped antenna devices which are connected (14) with each other by adjacent edge structures (12,13) and which during operation are orientated to have a downwards slope from said edge structures (12,13),
    wherein the two antenna devices respectively comprise at least two orthogonally mounted transmitter antenna elements (1,2) and at least two orthogonally mounted receiver antenna elements (3,4),
    in which the antenna elements (1–4) in each antenna device consist of monopoles formed by metal surfaces being applied to an electrically insulating plate carrier (6) that is located on the bottom side of a layer of radar absorbing material (7),
    in which the upper surface of the absorbing material (7) is covered by a metallic ground plane (8).

2. Antenna system in accordance with claim 1, wherein the plate carrier (6) is a laminate, in particular a printed circuit board laminate, preferentially consisting of a fibreglass substrate.

3. Antenna system in accordance with claim 1, wherein the antenna elements (1–4) have a triangular shape.

4. Antenna system in accordance with claim 1, wherein the antenna elements (1–4) are mounted with a 45 degree angle to the symmetry axis (5) between the two antenna devices.

5. Antenna system in accordance with claim 1–4, wherein the angle ($\alpha$) in the vertical plane between the two antenna devices can be adjusted by a hinge (14) connecting said edge sections (12, 13) to each other.

6. Antenna system in accordance with claim 1, wherein the transmitter antenna elements (1,2) serve for transmission of electromagnetic waves with two orthogonal polarisations (A and B, respectively), and the receiving antenna elements (3,4) serve for reception of electromagnetic waves having the same two orthogonal polarisations (A and B, respectively).

7. Antenna system in accordance with claim 1, wherein the feed points (9) of the antenna elements (1–4) are located in their respective metal boxes (12, 13) at said edge structures of the two antenna devices, wherein each metal box (12, 13) besides containing the electronics (20,30) of the radar also comprises a fixture for the plate carrier (6) and the ground plane (8).

8. Antenna system in accordance with claim 1, wherein the outer edges of the antenna elements (1–4) are connected to the ground planes (8) through resistors (10) and spacers (11).

9. Antenna system in accordance with claim 1, comprising several transmitter antenna elements and several receiver antenna elements forming an array of antenna subgroups distributed along the symmetry axis (5) between the two antenna devices, wherein each antenna subgroup consists of two transmitter antenna elements (1,2) and two receiver antenna elements (3,4).

10. Antenna system in accordance with claim 9, wherein at least some of the antenna subgroups overlap each other, wherein the overlapping neighbour antenna elements (2, 16) are separated in each intersection by an electrically insulating material (17).

* * * * *